(12) United States Patent
Cahalen et al.

(10) Patent No.: US 11,634,831 B2
(45) Date of Patent: Apr. 25, 2023

(54) COATED ARTICLES

(71) Applicant: Xtalic Corporation, Marlborough, MA (US)

(72) Inventors: John Cahalen, Arlington, MA (US); Alan C. Lund, Framingham, MA (US); Christopher A. Schuh, Wayland, MA (US)

(73) Assignee: Xtalic Corporation, Marlborough, MA (US)

( * ) Notice: Subject to any disclaimer, the term of this patent is extended or adjusted under 35 U.S.C. 154(b) by 0 days.

(21) Appl. No.: 16/715,579

(22) Filed: Dec. 16, 2019

(65) Prior Publication Data

US 2020/0232111 A1 Jul. 23, 2020

Related U.S. Application Data

(63) Continuation of application No. 15/705,959, filed on Sep. 15, 2017, now abandoned, which is a
(Continued)

(51) Int. Cl.
*B32B 15/01* (2006.01)
*C23C 30/00* (2006.01)
(Continued)

(52) U.S. Cl.
CPC ............. *C25D 3/48* (2013.01); *B32B 15/01* (2013.01); *B32B 15/018* (2013.01); *B32B 15/04* (2013.01);
(Continued)

(58) Field of Classification Search
CPC ..... C23C 28/021; C23C 28/00; C23C 28/023; C23C 28/026; C23C 28/02; C23C 30/00; C23C 30/005; C25D 5/10; C25D 5/12; C25D 5/18; C25D 3/48; C25D 3/12; C25D 5/617; C25D 5/619; C22C 19/03; Y10T 428/12833; Y10T 428/1284; Y10T 428/12771; Y10T 428/12944; Y10T 428/12875; Y10T 428/12826; Y10T 428/12889; Y10T 428/1291; Y10T 428/12882; Y10T 428/12896; Y10T 428/12868; Y10T 428/12903; Y10T 428/12931; Y10T 428/12937; B32B 15/01; B32B 15/018; B32B 15/04; B32B 15/043; B32B 15/20; H01R 13/03
See application file for complete search history.

(56) References Cited

U.S. PATENT DOCUMENTS 5,679,471 A * 10/1997 Cheng .................. H01R 13/03
200/266
6,755,958 B2 * 6/2004 Datta .................... C23C 28/021
205/176
(Continued)

FOREIGN PATENT DOCUMENTS

GB 2212516 A * 7/1989

*Primary Examiner* — Michael E. La Villa
(74) *Attorney, Agent, or Firm* — Wolf, Greenfield & Sacks, P.C.

(57) ABSTRACT

Coated articles and methods for applying coatings are described. In some cases, the coating can exhibit desirable properties and characteristics such as durability, corrosion resistance, and high conductivity. The articles may be coated, for example, using an electrodeposition process.

16 Claims, 11 Drawing Sheets

Related U.S. Application Data continuation of application No. 14/182,183, filed on Feb. 17, 2014, now Pat. No. 9,765,438, which is a continuation of application No. 12/500,786, filed on Jul. 10, 2009, now Pat. No. 8,652,649.

(51) Int. Cl.

| | |
|---|---|
| *C23C 28/00* | (2006.01) |
| *C25D 5/18* | (2006.01) |
| *C25D 5/12* | (2006.01) |
| *C25D 5/10* | (2006.01) |
| *C25D 3/48* | (2006.01) |
| *C25D 3/12* | (2006.01) |
| *C23C 28/02* | (2006.01) |
| *B32B 15/20* | (2006.01) |
| *B32B 15/04* | (2006.01) |
| *C22C 19/03* | (2006.01) |
| *H01R 13/03* | (2006.01) |
| *C25D 5/00* | (2006.01) |

(52) U.S. Cl.
CPC ............ *B32B 15/043* (2013.01); *B32B 15/20* (2013.01); *C22C 19/03* (2013.01); *C23C 28/00* (2013.01); *C23C 28/02* (2013.01); *C23C 28/021* (2013.01); *C23C 28/023* (2013.01); *C23C 28/026* (2013.01); *C23C 30/00* (2013.01); *C23C 30/005* (2013.01); *C25D 3/12* (2013.01); *C25D 5/10* (2013.01); *C25D 5/12* (2013.01); *C25D 5/18* (2013.01); *C25D 5/617* (2020.08); *C25D 5/619* (2020.08); *H01R 13/03* (2013.01); *Y10T 428/1284* (2015.01); *Y10T 428/1291* (2015.01); *Y10T 428/12771* (2015.01); *Y10T 428/12826* (2015.01); *Y10T 428/12833* (2015.01); *Y10T 428/12868* (2015.01); *Y10T 428/12875* (2015.01); *Y10T 428/12882* (2015.01); *Y10T 428/12889* (2015.01); *Y10T 428/12896* (2015.01); *Y10T 428/12903* (2015.01); *Y10T 428/12931* (2015.01); *Y10T 428/12937* (2015.01); *Y10T 428/12944* (2015.01)

(56) References Cited

U.S. PATENT DOCUMENTS

| | | | |
|---|---|---|---|
| 8,652,649 B2* | 2/2014 | Cahalen | C23C 28/021 |
| | | | 428/665 |
| 9,074,294 B2* | 7/2015 | Cahalen | C25D 3/12 |
| 9,765,438 B2* | 9/2017 | Cahalen | C23C 28/00 |
| 2006/0272949 A1* | 12/2006 | Detor | C25D 3/56 |
| | | | 205/238 |

* cited by examiner

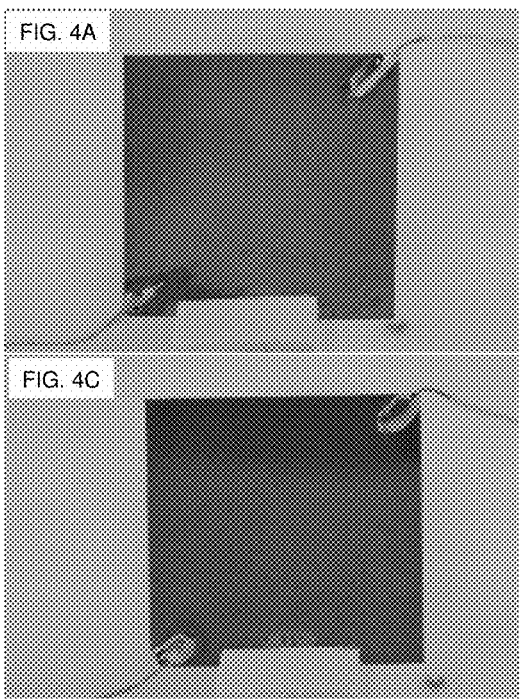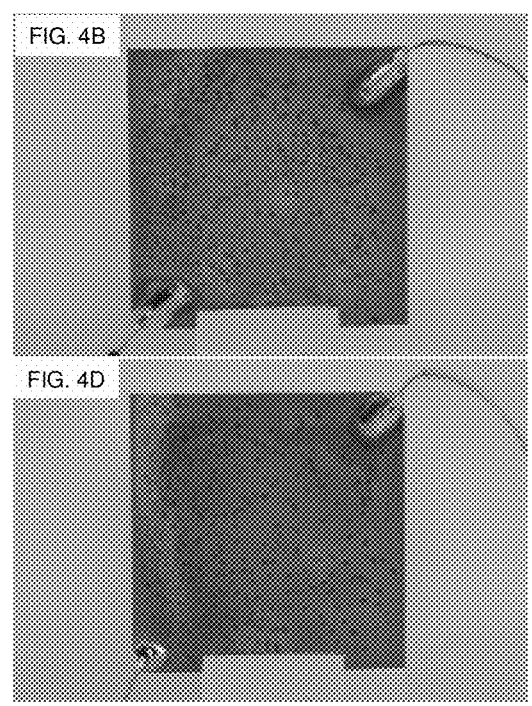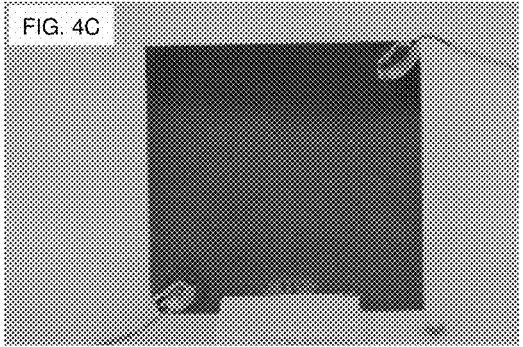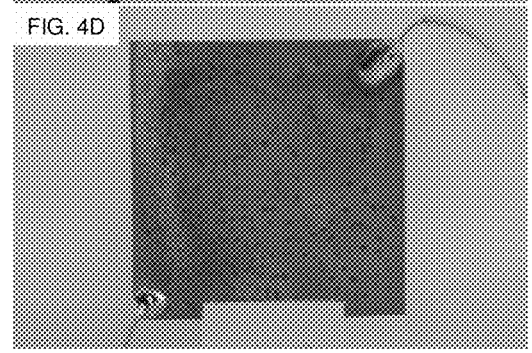

US 11,634,831 B2

COATED ARTICLES

RELATED APPLICATIONS

This application is a continuation of U.S. application Ser. No. 15/705,959, filed Sep. 15, 2017, which is a continuation of U.S. application Ser. No. 14/182,183 (now U.S. Pat. No. 9,765,438), filed Feb. 17, 2014, which is a continuation of U.S. application Ser. No. 12/500,786 (now U.S. Pat. No. 8,652,649), filed Jul. 10, 2009, each of which are incorporated herein by reference in its entirety.

FIELD OF INVENTION

The present invention generally relates to coated articles and related methods. In some embodiments, the articles are coated using an electrodeposition process.

BACKGROUND OF INVENTION

Many types of coatings may be applied on a base material. Electrodeposition is a common technique for depositing such coatings. Electrodeposition generally involves applying a voltage to a base material placed in an electrodeposition bath to reduce metal ionic species within the bath which deposit on the base material in the form of a metal, or metal alloy, coating. The voltage may be applied between an anode and a cathode using a power supply. At least one of the anode or cathode may serve as the base material to be coated. In some electrodeposition processes, the voltage may be applied as a complex waveform such as in pulse plating, alternating current plating, or reverse-pulse plating.

A variety of metal and metal alloy coatings may be deposited using electrodeposition. For example, metal alloy coatings can be based on two or more transition metals including Ni, W, Fe, Co, amongst others.

Corrosion processes, in general, can affect the structure and composition of an electroplated coating that is exposed to the corrosive environment. For example, corrosion can involve direct dissolution of atoms from the surface of the coating, a change in surface chemistry of the coating through selective dissolution or de-alloying, or a change in surface chemistry and structure of the coating through, e.g., oxidation or the formation of a passive film. Some of these processes may change the topography, texture, properties or appearance of the coating. For example, spotting and/or tarnishing of the coating may occur. Such effects may be undesirable, especially when the coating is applied at least in part to improve electrical conductivity since these effects can increase the resistance of the coating.

SUMMARY OF INVENTION

Coated articles and related methods are provided.

In one aspect, a method is provided. The method comprises electrodepositing a first layer of a coating on a base material using a waveform having a forward pulse and a reverse pulse, wherein the base material comprises copper, the first layer comprises Ni and the first layer comprises W and/or Mo, and the first layer has a thickness of greater than 5 microinches. The method further comprises electrodepositing a second layer of the coating on the first layer, the second layer comprising a metal selected from the group consisting of Au, Ru, Os, Rh, Ir, Pd, Pt, and/or Ag, the second layer having a thickness of less than 30 microinches.

In another aspect, an article is provided. The article comprises a base material comprising copper. The article further comprises a coating formed on the base material, the coating comprising a first layer comprising Ni, and W and/or Mo, wherein the first layer has a thickness of greater than 5 microinches, and a second layer formed on the first layer, the second layer comprising a metal selected from the group consisting of Au, Ru, Os, Rh, Ir, Pd, Pt, and/or Ag, wherein the second layer has a thickness of less than 30 microinches.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

FIGS. 4A-4D show photographs of coated articles as described in Example 3;

DETAILED DESCRIPTION

Coated articles and methods for applying coatings are described. The article may include a base material and a multi-layer coating formed thereon. In some cases, the coating includes a first layer that comprises am alloy (e.g., nickel-tungsten alloy) and a second layer that comprises a precious metal (e.g., Ru, Os, Rh, Ir, Pd, Pt, Ag, and/or Au). In some cases, the coating may be applied using an electrodeposition process. The coating can exhibit desirable properties and characteristics such as durability, corrosion resistance, and high conductivity, which may be beneficial, for example, in electrical applications. In some cases, the presence of the first layer may allow for a reduction in the thickness of the second layer while preserving the desirable properties.

Figure 1:
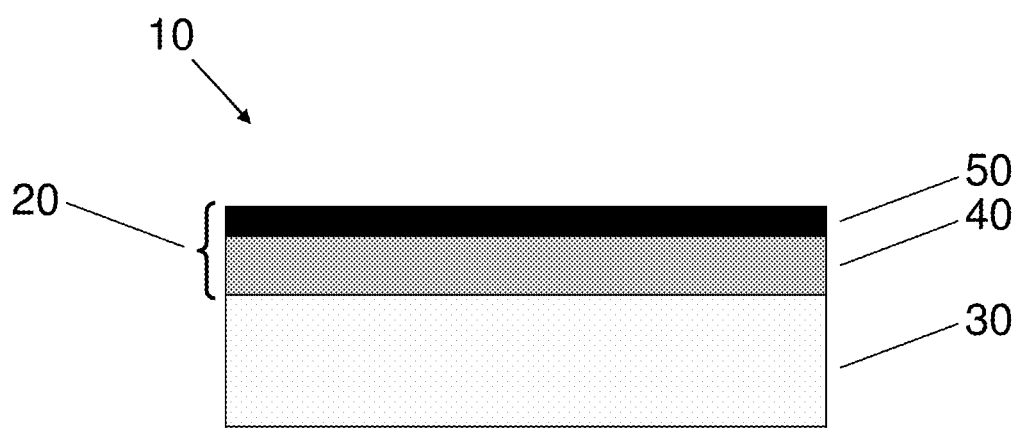
FIG. 1 shows a coated article according to some embodiments.

FIG. 1 shows an article 10 according to an embodiment. The article has a coating 20 formed on a base material 30. The coating may comprise a first layer 40 formed on the base material and a second layer 50 formed on the first layer. Each layer may be applied using a suitable process, as described in more detail below. It should be understood that the coating may include more than two layers. However, in some embodiments, the coating may only include two layers, as shown.

In some embodiments, the first layer comprises one or more metals. For example, the first layer may comprise a metal alloy. In some cases, alloys that comprise nickel are preferred. Such alloys may also comprise tungsten and/or molybdenum. Nickel-tungsten alloys may be preferred in some cases.

In some cases, the weight percent of nickel in the alloy may be between 25-75 weight percent; and, in some cases, between 50 and 70 weight percent. In these cases, the remainder of the alloy may be tungsten and/or molybdenum. Other weight percentages outside of this range may be used as well.

The first layer may have any thickness suitable for a particular application. For example, the first layer thickness may be greater than about 1 microinch (e.g., between about 1 microinch and about 100 microinches, between about 1 microinch and 50 microinches); in some cases, greater than about 5 microinches (e.g., between about 5 microinches and about 100 microinches, between about 5 microinches and 50 microinches); greater than about 25 microinches (e.g., between about 25 microinches and about 100 microinches, between about 1 microinch and 50 microinches). It should be understood that other first layer thicknesses may also be suitable. In some embodiments, the thickness of the first layer is chosen such that the first layer is essentially transparent on the surface. Thickness may be measured by techniques known to those in the art.

In some embodiments, it may be preferable for the first layer to be formed directly on the base material. Such embodiments may be preferred over certain prior art constructions that utilize a layer between the first layer and the base material because the absence of such an intervening layer can save on overall material costs. Though, it should be understood that in other embodiments, one or more layers may be formed between the first layer and the base material.

The second layer may comprise one or more precious metals. Examples of suitable precious metals include Ru, Os, Rh, Ir, Pd, Pt, Ag, and/or Au. Gold may be preferred in some embodiments. In some embodiments, the second layer consists essentially of one precious metal. In some embodiments, it may be preferable that the second layer is free of tin. In other cases, the second layer may comprise an alloy that includes at least one precious metal and at least one other metal. The metal may be selected from Ni, W, Fe, B, S, Co, Mo, Cu, Cr, Zn and Sn, amongst others.

The second layer may have any suitable thickness. It may be advantageous for the second layer to be thin, for example, to save on material costs. For example, the second layer thickness may be less than 30 microinches (e.g., between about 1 microinch and about 30 microinches; in some cases, between about 5 microinches and about 30 microinches); in some cases the second layer thickness may be less than 20 microinches (e.g., between about 1 microinch and about 20 microinches; in some cases, between about 5 microinches and about 20 microinches); and, in some cases, the second layer thickness may be less than 10 microinches (e.g., between about 1 microinch and about 10 microinches; in some cases, between about 5 microinches and about 10 microinches). In some embodiments, the thickness of the second layer is chosen such that the second layer is essentially transparent on the surface. It should be understood that other second layer thicknesses may also be suitable.

The second layer may cover the entire first layer. However, it should be understood that in other embodiments, the second layer covers only part of the first layer. In some cases, the second layer covers at least 50% of the surface area of the first layer; in other cases, at least 75% of the surface area of the first layer. In some cases, an element from the first layer may be incorporated within the second layer and/or an element from the second layer may be incorporated into the first layer.

In some cases, the coating (e.g., the first layer and/or the second layer) may have a particular microstructure. For example, at least a portion of the coating may have a nanocrystalline microstructure. As used herein, a "nanocrystalline" structure refers to a structure in which the number-average size of crystalline grains is less than one micron. The number-average size of the crystalline grains provides equal statistical weight to each grain and is calculated as the sum of all spherical equivalent grain diameters divided by the total number of grains in a representative volume of the body. In some embodiments, at least a portion of the coating may have an amorphous structure. As known in the art, an amorphous structure is a non-crystalline structure characterized by having no long range symmetry in the atomic positions. Examples of amorphous structures include glass, or glass-like structures. Some embodiments may provide coatings having a nanocrystalline structure throughout essentially the entire coating. Some embodiments may provide coatings having an amorphous structure throughout essentially the entire coating.

In some embodiments, the coating may comprise various portions having different microstructures. For example, the first layer may have a different microstructure than the second layer. The coating may include, for example, one or more portions having a nanocrystalline structure and one or more portions having an amorphous structure. In one set of embodiments, the coating comprises nanocrystalline grains and other portions which exhibit an amorphous structure. In some cases, the coating, or a portion thereof (i.e., a portion of the first layer, a portion of the second layer, or a portion of both the first layer and the second layer), may comprise a portion having crystal grains, a majority of which have a grain size greater than one micron in diameter. In some embodiments, the coating may include other structures or phases, alone or in combination with a nanocrystalline portion or an amorphous portion. Those of ordinary skill in the art would be able to select other structures or phases suitable for use in the context of the invention.

Advantageously, the coating (i.e., the first layer, the second layer, or both the first layer and the second layer) may be substantially free of elements or compounds having a high toxicity or other disadvantages. In some instances, it may also be advantageous for the coating to be substantially free of elements or compounds that are deposited using species that have a high toxicity or other disadvantages. For example, in some cases, the coating is free of chromium (e.g., chromium oxide), which is often deposited using chromium ionic species that are toxic (e.g., $Cr^{6+}$). Such coating may provide various processing, health, and environmental advantages over certain previous coatings.

In some embodiments, metal, non-metal, and/or metalloid materials, salts, etc. (e.g., phosphate or a redox mediator such as potassium ferricyanide, or fragment thereof) may be incorporated into the coating.

The composition of the coatings, or portions or layers thereof, may be characterized using suitable techniques known in the art, such as Auger electron spectroscopy (AES), X-ray photoelectron spectroscopy (XPS), etc. For example, AES and/or XPS may be used to characterize the chemical composition of the surface of the coating.

Base material 30 may be coated to form coated articles, as described above. In some cases, the base material may comprise an electrically conductive material, such as a metal, metal alloy, intermetallic material, or the like. Suitable base materials include steel, copper, aluminum, brass, bronze, nickel, polymers with conductive surfaces and/or surface treatments, transparent conductive oxides, amongst others. In some embodiments, copper base materials are preferred.

The articles can be used in a variety of applications including electrical applications such as electrical connectors (e.g., plug-type). The coating can impart desirable characteristics to an article, such as durability, corrosion resistance, and improved electrical conductivity. These properties can be particularly advantageous for articles in electrical applications such as electrical connectors, which may experience rubbing or abrasive stress upon connection to and/or disconnection from an electrical circuit that can damage or otherwise reduce the conductivity of a conductive layer on the article. In some embodiments, the presence of the first layer of a coating may provide at least some of the durability and corrosion resistance properties to the coating. Additionally, the presence of the first layer may allow the thickness of the second layer to be reduced, thereby reducing the amount of precious metal on the article significantly.

Coating 20 may be formed using an electrodeposition process. Electrodeposition generally involves the deposition of a material (e.g., electroplate) on a substrate by contacting the substrate with a electrodeposition bath and flowing electrical current between two electrodes through the electrodeposition bath, i.e., due to a difference in electrical potential between the two electrodes. For example, methods described herein may involve providing an anode, a cathode, an electrodeposition bath (also known as an electrodeposition fluid) associated with (e.g., in contact with) the anode and cathode, and a power supply connected to the anode and cathode. In some cases, the power supply may be driven to generate a waveform for producing a coating, as described more fully below.

Generally, the first layer and the second layer of the coating may be applied using separate electrodeposition baths. In some cases, individual articles may be connected such that they can be sequentially exposed to separate electrodeposition baths, for example in a reel-to-reel process. For instance, articles may be connected to a common conductive substrate (e.g., a strip). In some embodiments, each of the electrodeposition baths may be associated with separate anodes and the interconnected individual articles may be commonly connected to a cathode.

The electrodeposition process(es) may be modulated by varying the potential that is applied between the electrodes (e.g., potential control or voltage control), or by varying the current or current density that is allowed to flow (e.g., current or current density control). In some embodiments, the coating may be formed (e.g., electrodeposited) using direct current (DC) plating, pulsed current plating, reverse pulse current plating, or combinations thereof. In some embodiments, reverse pulse plating may be preferred, for example, to form the first layer (e.g., nickel-tungsten alloy). Pulses, oscillations, and/or other variations in voltage, potential, current, and/or current density, may also be incorporated during the electrodeposition process, as described more fully below. For example, pulses of controlled voltage may be alternated with pulses of controlled current or current density. In general, during an electrodeposition process an electrical potential may exist on the substrate (e.g., base material) to be coated, and changes in applied voltage, current, or current density may result in changes to the electrical potential on the substrate. In some cases, the electrodeposition process may include the use waveforms comprising one or more segments, wherein each segment involves a particular set of electrodeposition conditions (e.g., current density, current duration, electrodeposition bath temperature, etc.), as described more fully below.

Some embodiments of the invention involve electrodeposition methods wherein the grain size of electrodeposited materials (e.g., metals, alloys, and the like) may be controlled. In some embodiments, selection of a particular coating (e.g., electroplate) composition, such as the composition of an alloy deposit, may provide a coating having a desired grain size. In some embodiments, electrodeposition methods (e.g., electrodeposition conditions) described herein may be selected to produce a particular composition, thereby controlling the grain size of the deposited material. The methods of the invention may utilize certain aspects of methods described in U.S. Patent Publication No. 2006/02722949, entitled "Method for Producing Alloy Deposits and Controlling the Nanostructure Thereof using Negative Current Pulsing Electrodeposition, and Articles Incorporating Such Deposits" and U.S. application Ser. No. 12/120,564, entitled "Coated Articles and Related Methods," filed May 14, 2008, which are incorporated herein by reference in their entirety. Aspects of other electrodeposition methods may also be suitable including those described in U.S. Patent Publication No. 2006/0154084 and U.S. application Ser. No. 11/985,569, entitled "Methods for Tailoring the Surface Topography of a Nanocrystalline or Amorphous Metal or Alloy and Articles Formed by Such Methods", filed Nov. 15, 2007, which are incorporated herein by reference in their entireties.

In some embodiments, a coating, or portion thereof, may be electrodeposited using direct current (DC) plating. For example, a substrate (e.g., electrode) may be positioned in contact with (e.g., immersed within) a electrodeposition bath comprising one or more species to be deposited on the substrate. A constant, steady electrical current may be passed through the electrodeposition bath to produce a coating, or portion thereof, on the substrate. As described above, a reverse pulse current may also be used.

The electrodeposition processes use suitable electrodeposition baths. Such baths typically include species that may be deposited on a substrate (e.g., electrode) upon application of a current. For example, an electrodeposition bath comprising one or more metal species (e.g., metals, salts, other metal sources) may be used in the electrodeposition of a coating comprising a metal (e.g., an alloy). In some cases, the electrochemical bath comprises nickel species (e.g., nickel sulfate) and tungsten species (e.g., sodium tungstate) and may be useful in the formation of, for example, nickel-tungsten alloy coatings.

Typically, the electrodeposition baths comprise an aqueous fluid carrier (e.g., water). However, it should be understood that other fluid carriers may be used in the context of the invention, including, but not limited to, molten salts, cryogenic solvents, alcohol baths, and the like. Those of ordinary skill in the art would be able to select suitable fluid carriers for use in electrodeposition baths. In some cases, the electrodeposition bath may be selected to have a pH from about 7.0-9.0. In some cases, the electrodeposition bath may have a pH from about 7.6 to 8.4, or, in some cases, from about 7.9 to 8.1.

The electrodeposition baths may include other additives, such as wetting agents, brightening or leveling agents, and the like. Those of ordinary skill in the art would be able to select appropriate additives for use in a particular application. In some cases, the electrodeposition bath includes citrate ions as additives. In some cases, the citrate ion content may be from about 35-150 g/L, 40-80 g/L, or, in some cases, 60-66 g/L.

Methods of the invention may be advantageous in that coatings (e.g., Ni—W alloy coatings) having various compositions may be readily produced by a single electrodeposition step. For example, a coating comprising a layered composition, graded composition, etc., may be produced in a single electrodeposition bath and in a single deposition step by selecting a waveform having the appropriate segments. The coated articles may exhibit enhanced corrosion resistance and surface properties.

It should be understood that other techniques may be used to produce coatings as described herein, including vapor-phase processes, sputtering, physical vapor deposition, chemical vapor deposition, thermal oxidation, ion implantation, spray coating, powder-based processes, slurry-based processes, etc.

In some embodiments, the invention provides coated articles that are capable of resisting corrosion, and/or protecting an underlying substrate material from corrosion, in one or more potential corrosive environments. Examples of such corrosive environments include, but are not limited to, aqueous solutions, acid solutions, alkaline or basic solutions, or combinations thereof. For example, coated articles described herein may be resistant to corrosion upon exposure to (e.g., contact with, immersion within, etc.) a corrosive environment, such as a corrosive liquid, vapor, or humid environment.

The corrosion resistance may be assessed using tests such as ASTM B735, entitled "Standard Test Method for Porosity in Gold Coatings on Metal Substrates by Nitric Acid Vapor," and ASTM B845, entitled "Standard Guide for Mixed Flowing Gas (MFG) Tests for Electrical Contacts" following the Class IIa protocol, may also be used to assess the corrosion resistance of coated articles. These tests outline procedures in which coated substrate samples are exposed to a corrosive atmosphere (i.e., nitric acid vapor or a mixture of $NO_2$, $H_2S$, $Cl_2$, and $SO_2$). The mixture of flowing gas can comprise 200+/−50 ppb of $NO_2$, 10+/−5 ppb of $H_2S$, 10+/−3 ppb of $Cl_2$, and 100+/−20 ppb $SO_2$. The temperature and relative humidity may also be controlled. For example, the temperature may be 30+/−1° C., and the relative humidity may be 70+/−2%.

The exposure time of an article to a gas or gas mixture can be variable, and is generally specified by the end user of the product or coating being tested. For example, the exposure time may be at least 30 minutes, at least 2 hours, at least 1 day, at least 5 days, or at least 40 days. After a prescribed amount of exposure time, the sample is examined (e.g., visually by human eye and/or instrumentally as described below) for signs of change to the surface appearance and/or electrical conductivity resulting from corrosion and/or spotting. The test results can be reported using a simple pass/fail approach after the exposure time.

The coating subjected to the test conditions discussed above may be evaluated, for example, by measuring the change in the appearance of the coating. For instance, a critical surface area fraction may be specified, along with a specified time. If, after testing for the specified time, the fraction of the surface area of the coating that changes in appearance resulting from corrosion is below the specified critical value, the result is considered passing. If more than the critical fraction of surface area has changed in appearance resulting from corrosion, then the result is considered failing. For example, the extent of corrosive spotting may be determined. The extent of spotting may be quantified by determining the number density and/or area density of spots after a specified time. For example, the number density may be determined counting the number of spots per unit area (e.g., spots/$cm^2$). The spot area density can be evaluated by measuring the fraction of the surface area occupied by the spots, where, for example, an area density equal to unity indicates that 100% of the surface area is spotted, an area density equal to 0.5 indicates that 50% of the surface area is spotted, and an area density equal to 0 indicates that none of the surface area is spotted.

In some cases, the coated article that is exposed to nitric acid vapor according to ASTM B735 for 2 hours or mixed flowing gas according to ASTM B845, protocol Class IIa, for 5 days has a spotting area density of less than 0.10; in some cases, less than 0.05; and, in some cases, 0. In some embodiments, the coated article exposed to these conditions has a number density of spots of less than 3 spots/$cm^2$; in some embodiments, less than 2 spots/$cm^2$; and, in some embodiments, 0 spots/$cm^2$. It should be understood that spotting area densities and the number density of spots may be outside the above-noted ranges.

The low-level contact resistance of a sample may be determined before and/or after exposure to a corrosive environment for a set period of time according to one of the tests described above. In some embodiments, the low-level contact resistance may be determined according to specification EIA 364, test procedure 23. Generally, the contact resistivity of a sample may be measured by contacting the sample under a specified load and current with a measurement probe having a defined cross-sectional area of contact with the sample. For example, the low-level contact resistance may be measured under a load of 25 g, 50 g, 150 g, 200 g, etc. Generally, the low-level contact resistance decreases as the load increases.

A threshold low-level contact resistance value may be set where measurement of a low-level contact resistance value for a sample above the threshold indicates that the sample failed the test. For example, the threshold low-level contact resistance value under a load of 25 g after 2 hours exposure to nitric acid vapor according to ASTM B735 or after 5 days exposure to mixed flowing gas according to ASTM B845, protocol Class IIa, may be greater than 1 mOhm, greater than 10 mOhm, greater than 100 mOhm, or greater than 1000 mOhm. It should be understood that other threshold low-level contact resistance values may be achieved.

In some embodiments, a coated article has reduced low-level contact resistance. Reduced low-level contact resistance may be useful for articles used in electrical applications such as electrical connectors. In some cases, an article may have a low-level contact resistance under a load of 25 g of less than about 100 mOhm; in some cases, less than about 10 mOhm; in some cases, less than about 5 mOhm; and, in some cases, less than about 1 mOhm. It should be understood that the article may have a low-level contact resistance outside this range as well. It should also be understood that the cross-sectional area of contact by the measurement probe may affect the value of the measured low-level contact resistance.

Durability of the coated articles may also be tested. In some embodiments, durability tests may be performed in conjunction with the corrosion tests discussed above and/or contact resistance measurements. A durability test may comprise rubbing the surface of a coated article with an object for a period of time and then visually inspecting the coating for damage and/or measuring the contact resistance of the coating. In one non-limiting example of a durability test, a counterbody may be held against the surface of a coated article at a set load and the coated article may be reciprocated such that the counterbody rubs against the surface of the coated article. For example, the counterbody may be held against the surface of a coated article at a load of 50 g. The duration of the reciprocal motion may be measured, for example, by the number of cycles per unit time per unit time. For instance, the reciprocal motion may be carried out for 500 seconds at a rate of 1 cycle per second. In some embodiments, durability may be measured before and/or after subjection of an article to a corrosion test as discussed in more detail above. The contact resistance of the coating may be measured as described above. In some cases, the coating may be visually inspected for wear tracks. The wear tracks may, in some embodiments, be analyzed by measuring the width of exposed base material between the wear tracks after a specific number of cycles under a specific load. In some instances, the analysis may be a "pass/fail" test, where a threshold width of exposed base material between wear tracks is set such that the presence of a width of exposed base material above the threshold indicates the article failed the test.

The following examples should not be considered to be limiting but illustrative of certain features of the invention.

EXAMPLES

Example 1

Figure 2A:
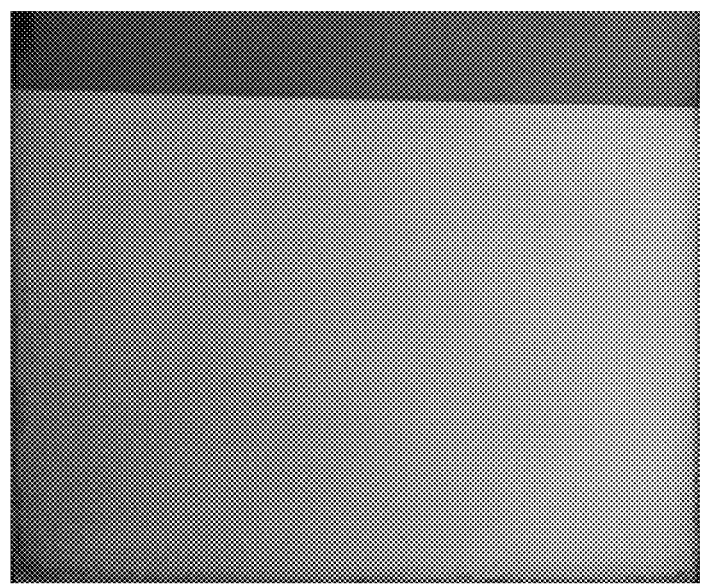
FIGS. 2A-2C show photographs of coated articles as described in Example 1.
Figure 2B:
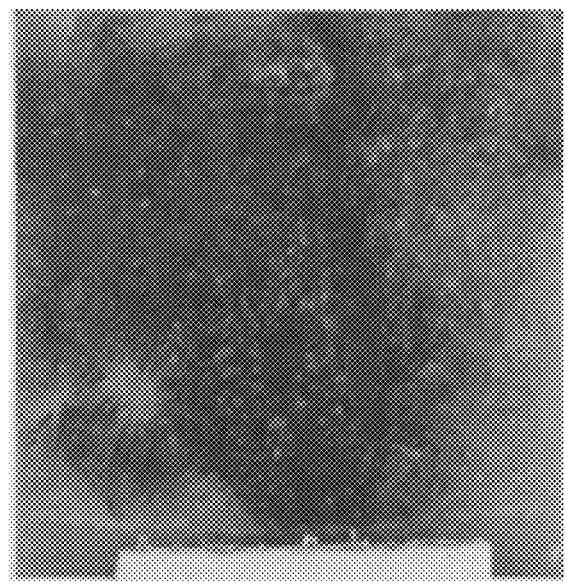
Figure 2C:

This example compares the corrosion resistance of an article including a coating having a first layer produced in accordance with some embodiments of the invention to the corrosion resistance of two articles having conventional coatings. FIGS. 2A-2C each show an article after exposure to nitric acid vapor for 30 minutes according to ASTM B0735-06. FIG. 2A shows a copper base material coated with a layer of Ni—W (approximately 40-50 microinches thick) using a pulsed reverse DC current exhibiting essentially no corrosion, FIG. 2B shows a copper base material coated with nickel (approximately 40-50 microinches thick, electrodeposited using a Ni-sulfamate bath using a pulsed DC current) exhibiting significant corrosion, and FIG. 2C shows a copper base material coated with electroplated nickel-phosphorus (EP-NiP) (approximately 40-50 microinches thick, electrodeposited using a pulsed DC current) exhibiting significant corrosion. This example demonstrates that coated articles of the invention have improved corrosion resistance as compared to conventional coated articles.

Example 2

Figure 3A:
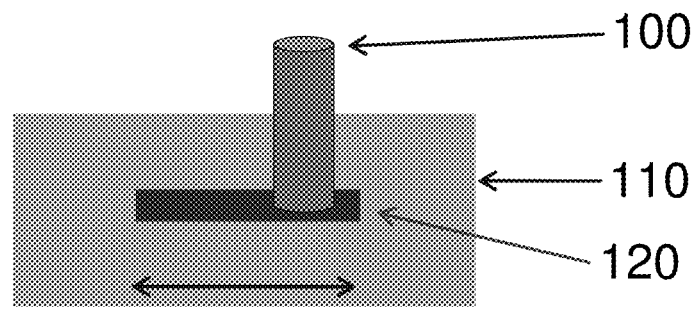
FIGS. 3A-3C show a test procedure and photographs of coated articles as described in Example 2.
Figure 3B:
Figure 3C:

This example compares the durability of an article including a coating having a first layer produced in accordance with some embodiments of the invention to the durability of an article having a conventional coating. FIG. 3A shows a schematic of the test procedure for assaying the durability of a coated article. A counterbody 100, plated with the same material as the wear surface, was held stationary against coated article 110 with a load of 50 g while the coated article was moved reciprocally against the counterbody along path 120 for 500 cycles at a frequency of about 1 cycle per second. FIG. 3B shows a copper base material coated with nickel (approximately 40-50 microinches thick, electrodeposited using a nickel-sulfamate bath and pulsed DC current) exhibiting extensive wear tracks 130. FIG. 3C shows a copper base material coated with Ni—W (approximately 40-50 microinches thick, electrodeposited using a pulsed reverse DC current) exhibiting significantly fewer wear tracks. This example demonstrates that coated articles of the invention have improved durability as compared to conventional coated articles.

Example 3

This example compares the corrosion resistance of articles including a coating having two layers produced in accordance with some embodiments of the invention to the corrosion resistance of two articles having conventional coatings. FIGS. 4A-4D each show an article after exposure to mixed flowing gas for 5 days according to ASTM B0845-97R08E01. FIG. 4A-4B show a copper base material coated with a first layer of Ni—W (40 microinches thick, electrodeposited using a pulsed reverse DC current) and a second layer of 20 microinch thick Au—Co alloy (FIG. 4A) or 30 microinch thick Au—Co alloy (FIG. 4B) exhibiting essentially no corrosion. FIG. 4C-4D show a copper base material coated with a first layer of nickel (electrodeposited using a Ni-sulfamate bath and pulsed DC current) and a second layer of 20 microinch thick Au—Co alloy (FIG. 4C) or 30 microinch thick Au—Co alloy (FIG. 4D) exhibiting significant corrosion and pitting. This example demonstrates that coated articles of the invention have improved corrosion resistance as compared to conventional coated articles.

Example 4

Figure 5A:
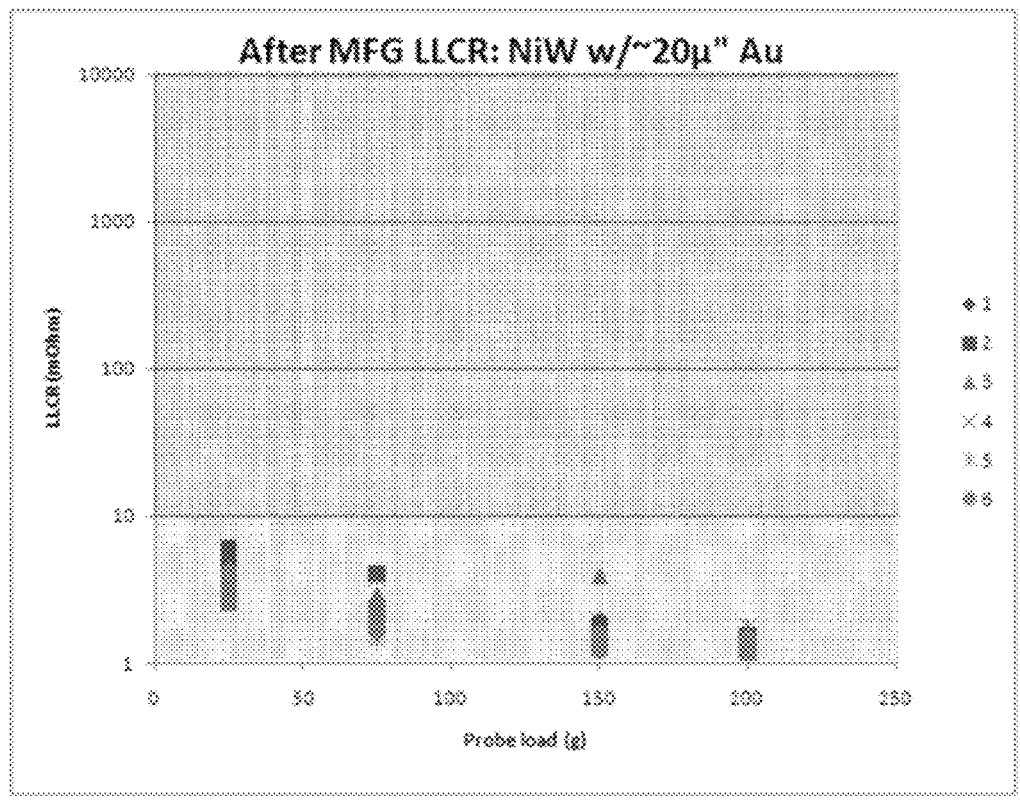
FIGS. 5A-5D show plots of contact resistance measurements as described in Example 4.
Figure 5B:
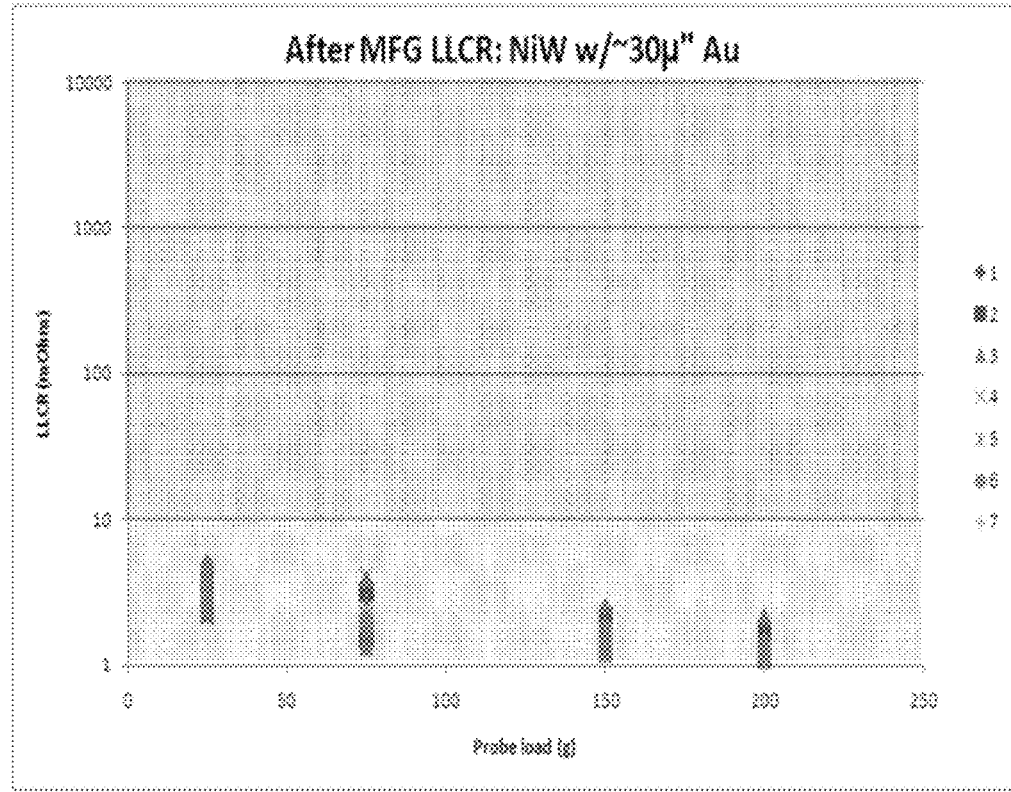
Figure 5C:
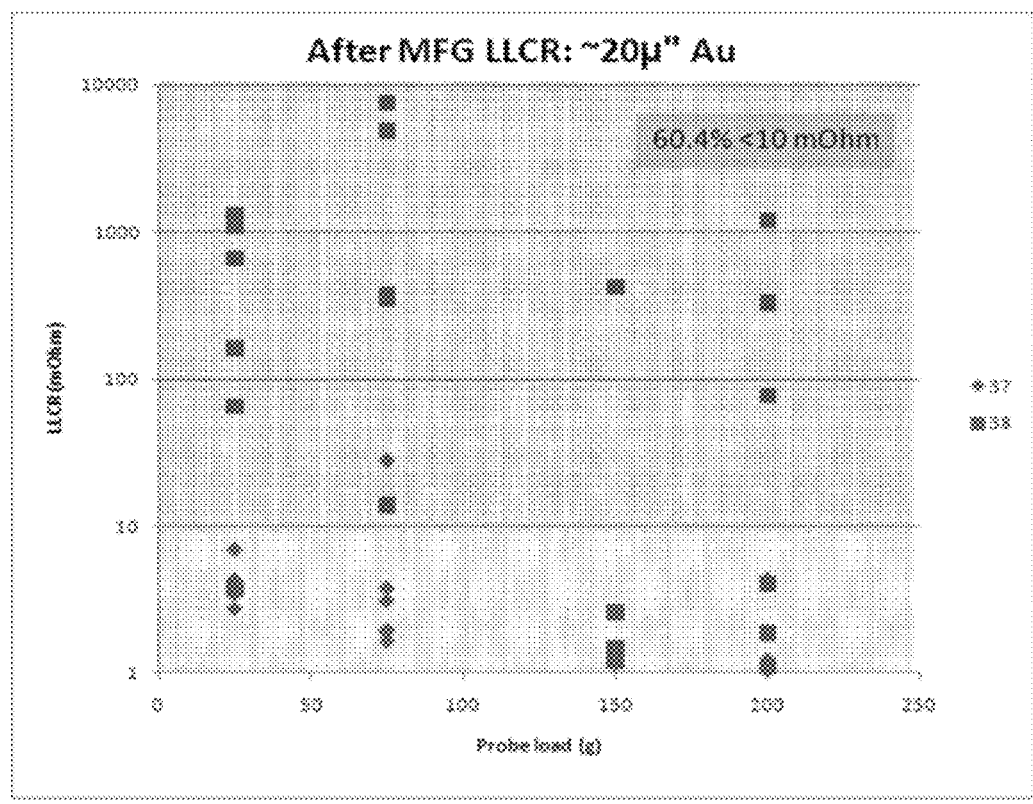
Figure 5D:
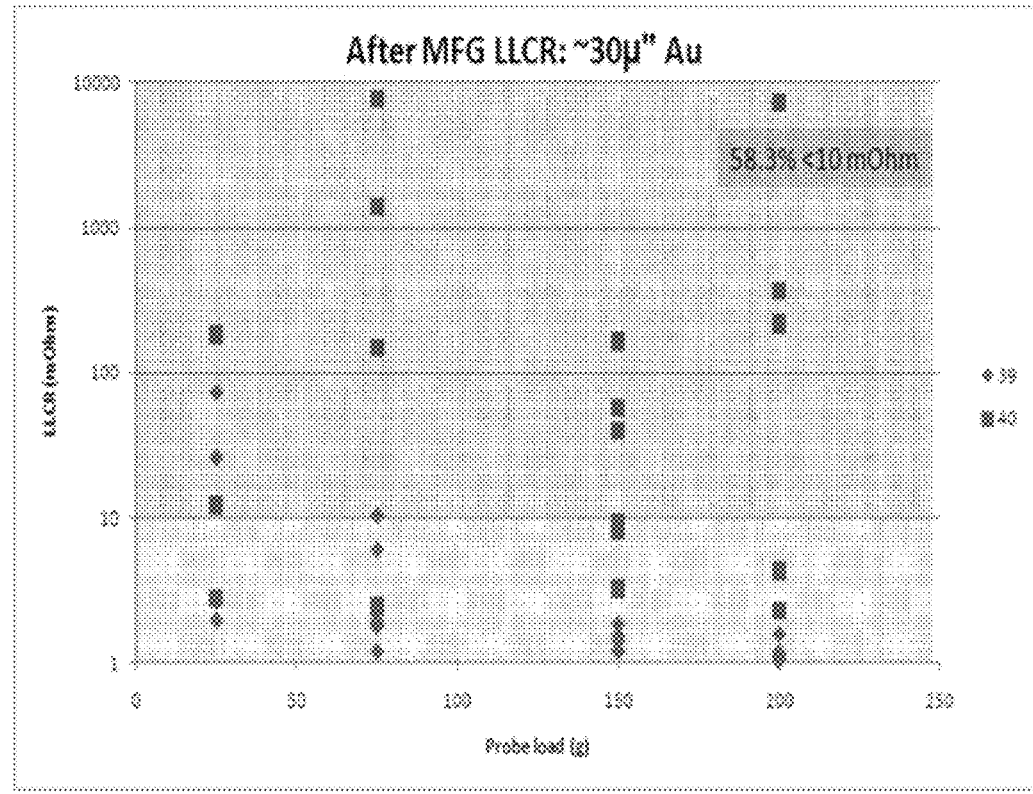

This example compares the contact resistance of articles including a coating having two layers produced in accordance with some embodiments of the invention exposed to corrosive conditions to the contact resistance of two articles having conventional coatings exposed to corrosive conditions. FIGS. 5A-5D quantify the low-level contact resistance of the coated articles from Example 3 and each shows the results of multiple replicates. FIG. 5A shows the contact resistance of a base material coated with Ni—W and 20 microinches of Au—Co alloy, and FIG. 5B shows the contact resistance of a base material coated with Ni—W and 30 microinches of Au—Co alloy. In both cases, the contact resistance was less than 10 mOhm, which was the threshold defined as a "pass" for this test. FIGS. 5C and 5D show the contact resistance for base materials coated with nickel (electrodeposited using a Ni-sulfamate bath) and 20 microinches of gold or 30 microinches of gold, respectfully. Both articles failed the contact resistance test, as indicated by the data points above 10 mOhm. This example demonstrates that coated articles of the invention have improved contact resistance after exposure to corrosive conditions as compared to conventional coated articles.

Example 5

Figure 6:
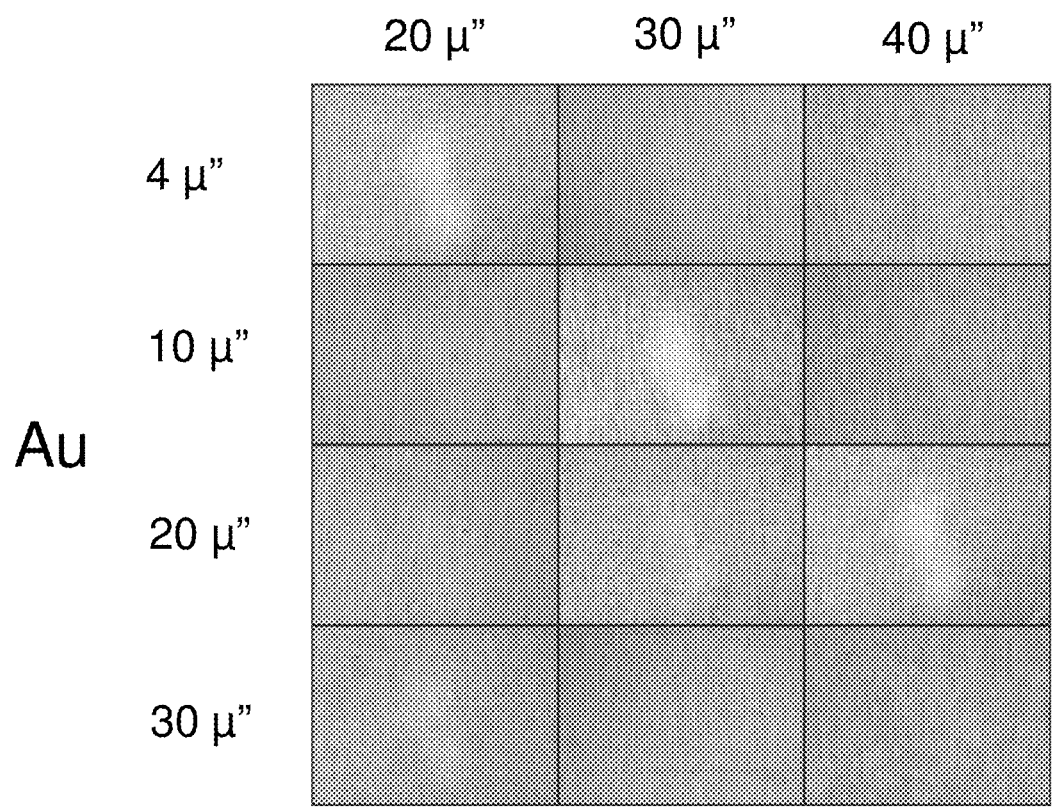
FIGS. 6-7 shows photographs of coated articles as described in Example 5.
Figure 7:
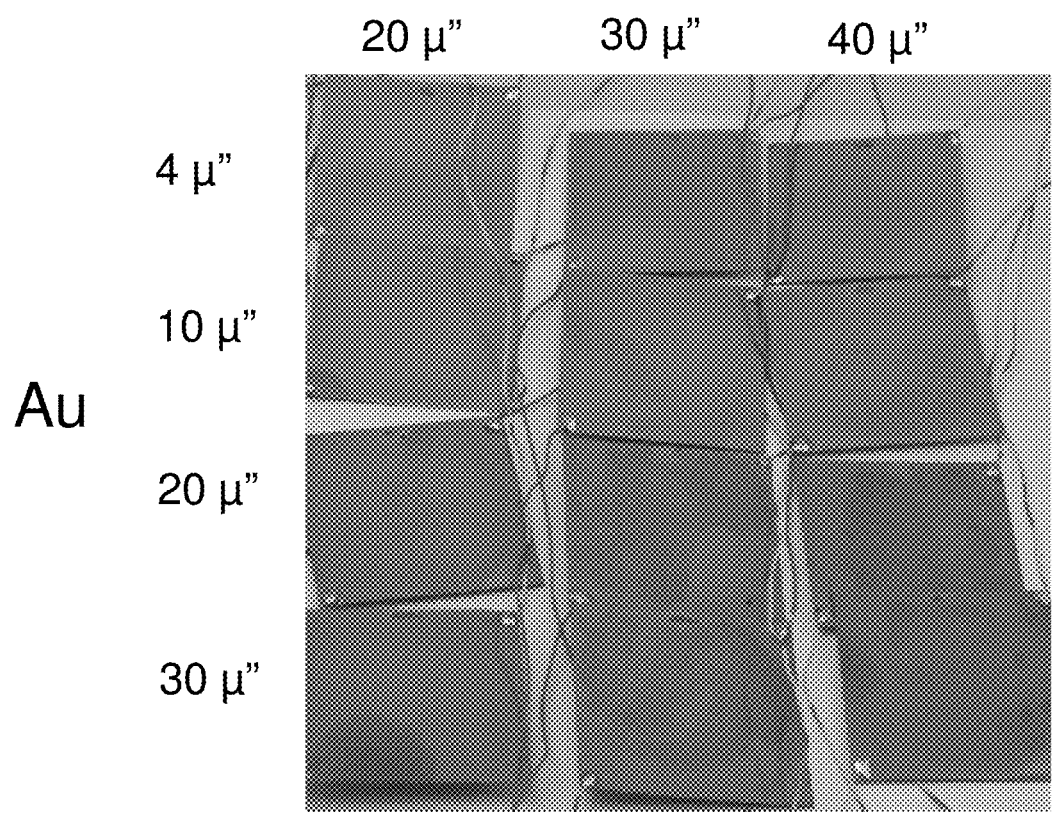
Figure 8A:
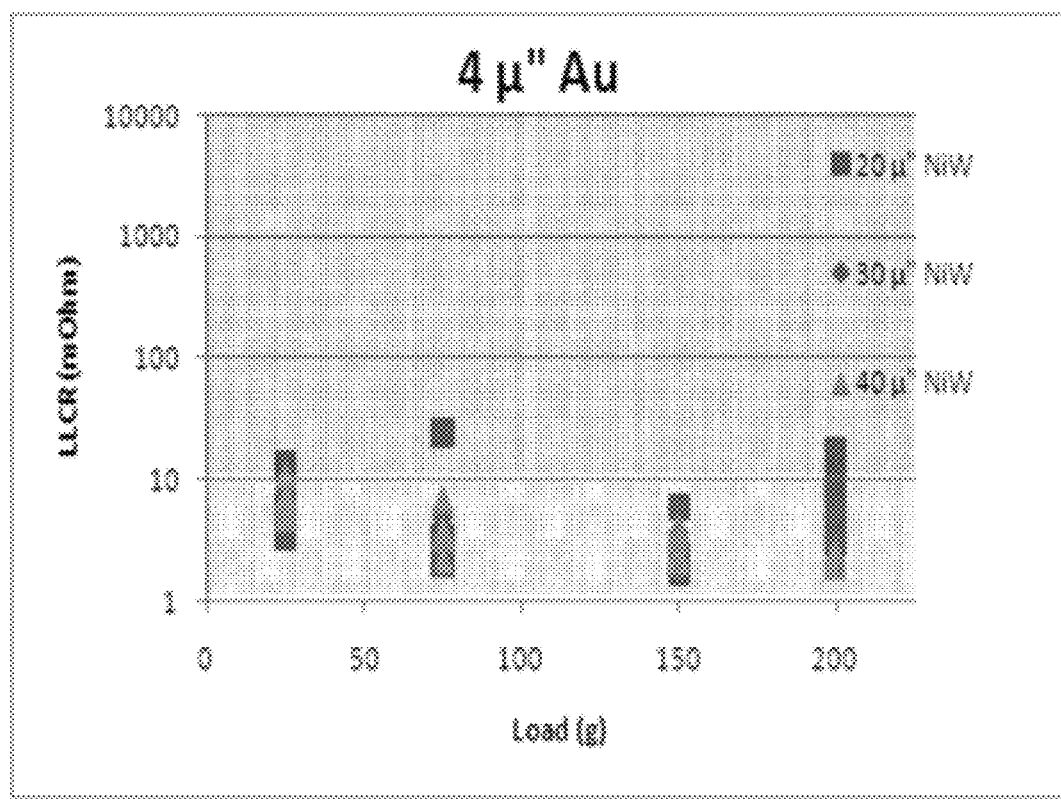
FIGS. 8A-9B show plots of contact resistance measurements as described in Example 5.
Figure 8B:
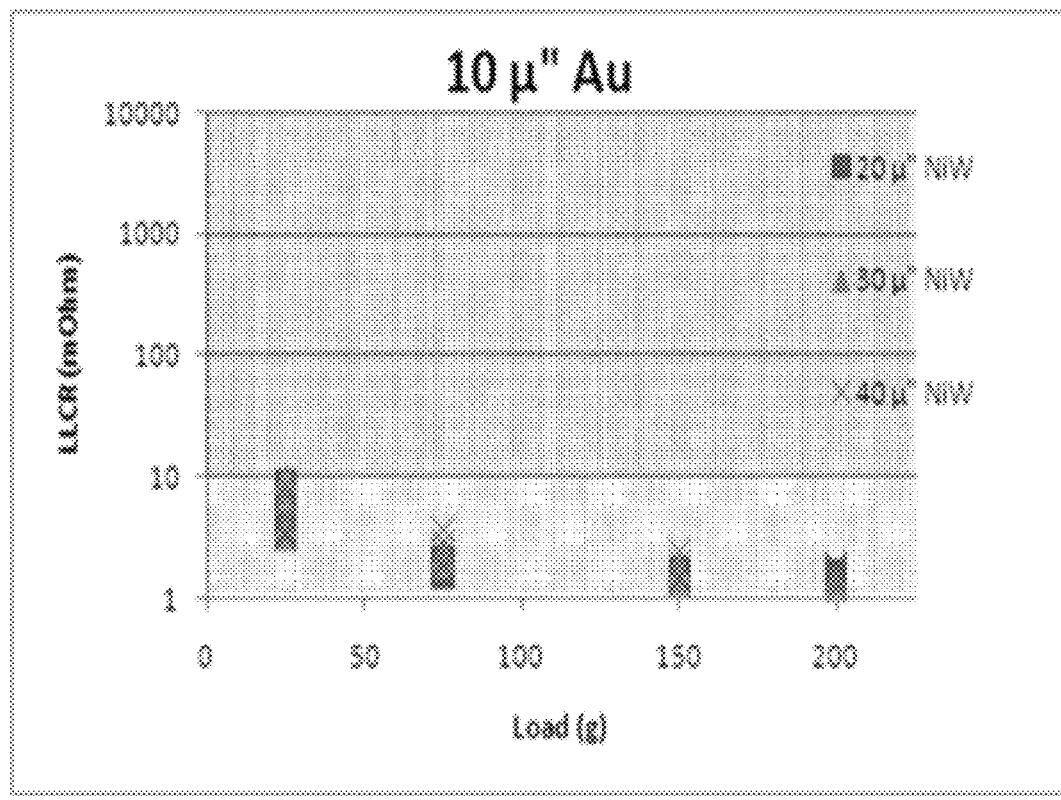
Figure 8C:
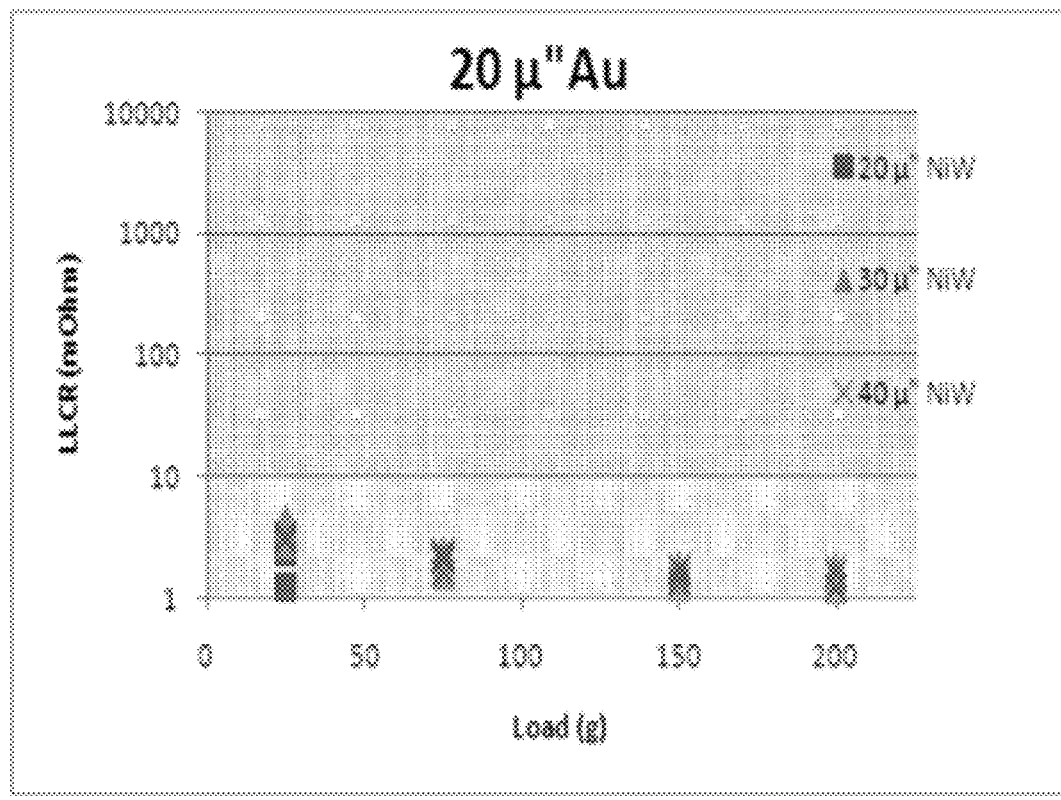
Figure 8D:
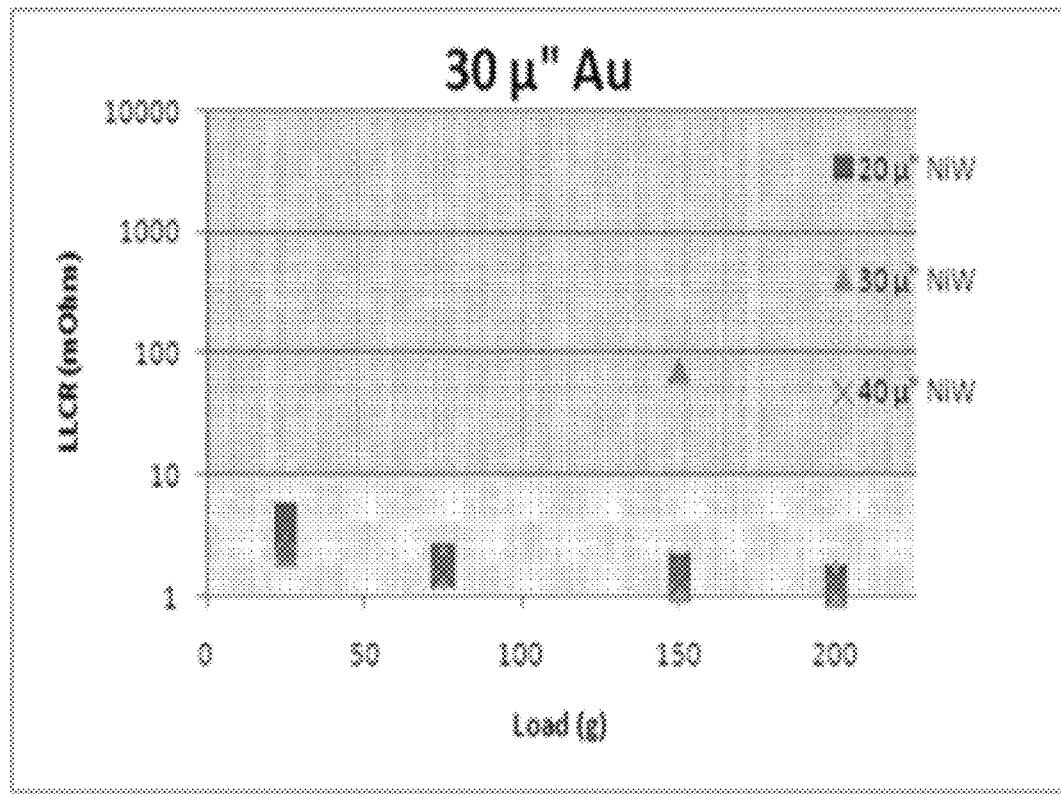
Figure 9A:
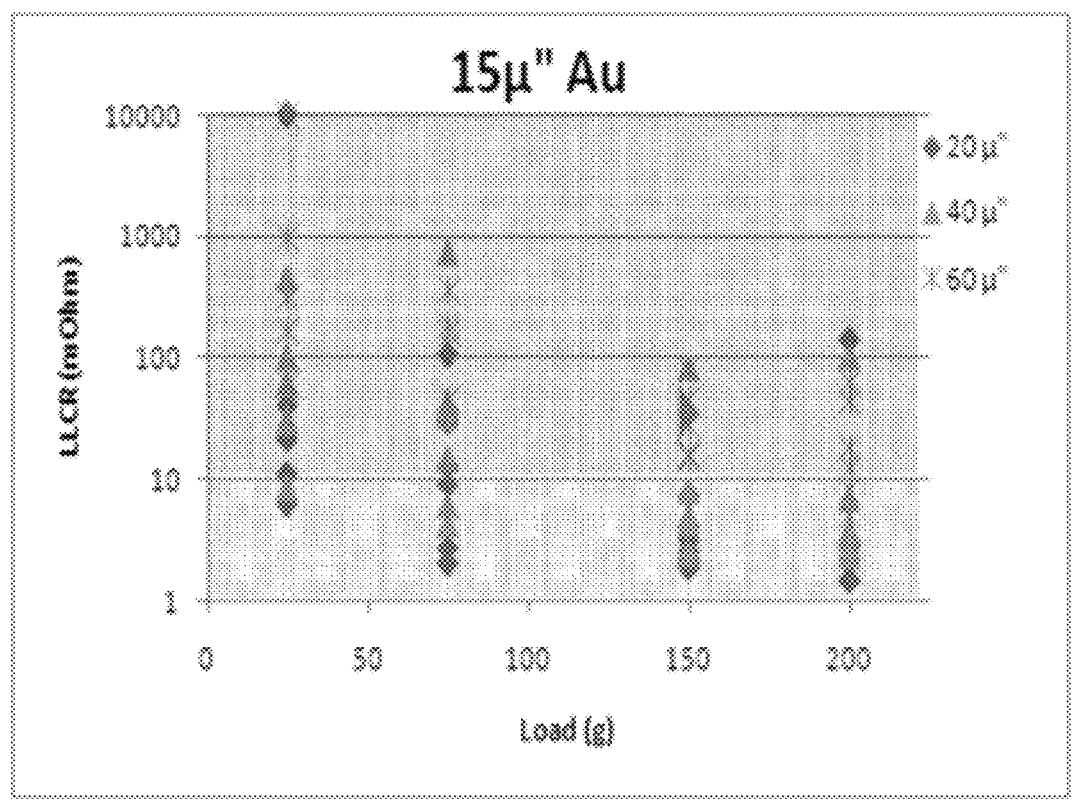
Figure 9B:
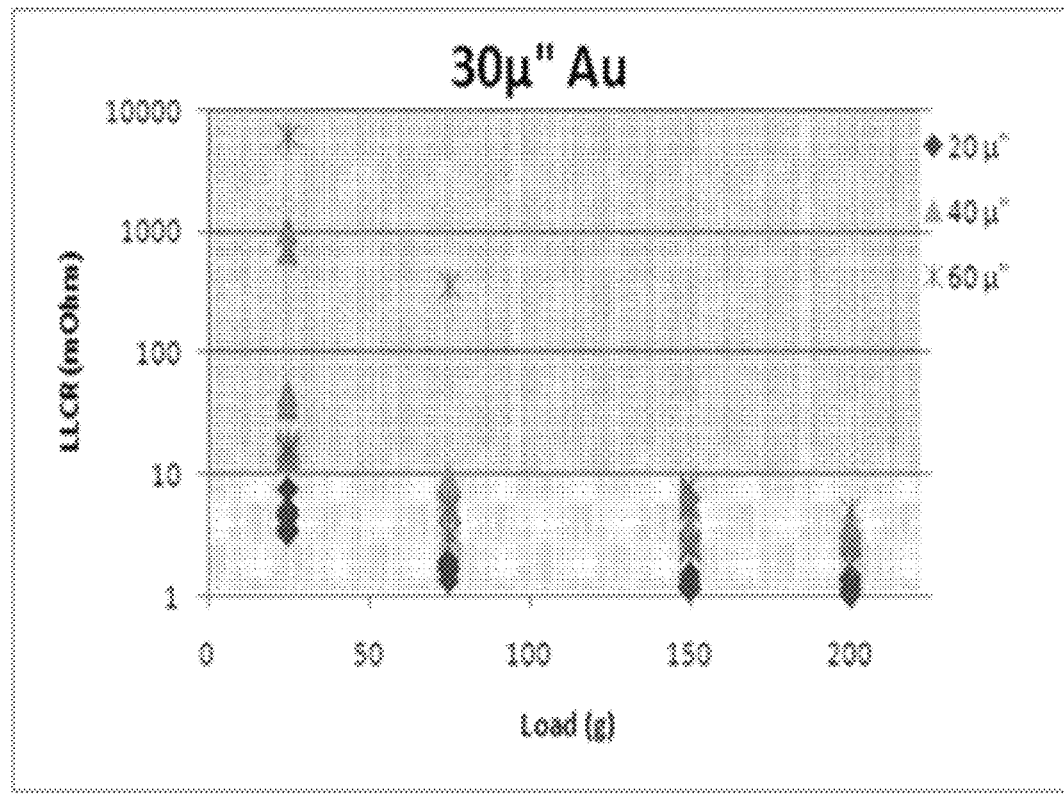

This example compares the contact resistance of articles including a coating having two layers produced in accordance with some embodiments of the invention exposed to corrosive conditions to the contact resistance of two articles having conventional coatings exposed to corrosive conditions. FIG. 6 shows stereoscope images (~10× magnification) of a series of coated articles, each exposed to nitric acid vapor for 2 hours. The thickness of the first layer (Ni—W, electrodeposited using a pulsed reverse DC current) is listed at the top of each column and corresponds to the thickness of the first layer on each base material in the respective column (from left to right: 20 microinches, 30 microinches, and 40 microinches). The thickness of the second layer (Au—Co) is listed at the left of each row and corresponds to the thickness of the second coating on each base material in the respective row (from top to bottom: 4 microinches, 10 microinches, 20 microinches, and 30 microinches). FIG. 7 shows a non-magnified image of a series of coated articles, the series having the same specifications as those in FIG. 6, where each is exposed to mixed flowing gas for 5 days. FIGS. 8A-8D show contact resistance measurements for the coated articles shown in FIG. 7. As a control, FIGS. 9A-9B show contact resistance measurements for articles including a coating having a first layer of EP-NiP (electrodeposited using a pulsed DC current) and a second layer of Au—Co after exposure to nitric acid vapor for 2 hours. This example demonstrates that coated articles of the invention have improved contact resistance after exposure to corrosive conditions as compared to conventional coated articles.

What is claimed:

1. An article, comprising:
   a base material;
   a coating formed on the base material, the coating comprising:
   a first layer comprising Ni, and W and/or Mo, wherein the first layer is nanocrystalline; and
   a second layer formed on the first layer, the second layer comprising Pt, wherein the second layer is nanocrystalline or amorphous.

2. The article of claim 1, wherein the first layer is formed directly on the base material.

3. The article of claim 1, wherein the second layer is formed directly on the first layer.

4. The article of claim 1, wherein th first layer and the second layer are electrodeposited.

5. The article of claim 1, wherein the second layer covers an entire surface of the first layer.

6. The article of claim 1, wherein the second layer covers only part of a surface of the first layer.

7. The article of claim 1, wherein the second layer is nanocrystalline.

8. The article of claim 1, wherein the base material comprises an electrically conductive material.

9. The article of claim 1, wherein the article is an electrical connector.

10. The article of claim 1, wherein the weight percent of nickel in the first layer is between 25-75 weight percent.

11. The article of claim 1, wherein the weight percent of nickel in the first layer is between 50-70 weight percent.

12. The article of claim 1, wherein the first layer comprises a nickel-tungsten alloy.

13. The article of claim 12, wherein the first layer is formed directly on the base material.

14. The article of claim 12, wherein the second layer is formed directly on the first layer.

15. The article of claim 12, wherein the second layer is nanocrystalline.

16. The article of claim 12, wherein the article is an electrical connector.

* * * * *